(12) United States Patent
Bennison

(10) Patent No.: US 12,457,101 B1
(45) Date of Patent: Oct. 28, 2025

(54) SYSTEMS AND METHODS USING DNS TUNNELING FOR FAST SYMMETRIC SESSION ENCRYPTION KEY ESTABLISHMENT USING A COMPUTING DEVICE

(71) Applicant: James E. Bennison, Oakton, VA (US)

(72) Inventor: James E. Bennison, Oakton, VA (US)

( * ) Notice: Subject to any disclaimer, the term of this patent is extended or adjusted under 35 U.S.C. 154(b) by 0 days.

(21) Appl. No.: 19/012,244

(22) Filed: Jan. 7, 2025

(51) Int. Cl.
 *H04L 9/08* (2006.01)
 *H04L 61/4511* (2022.01)

(52) U.S. Cl.
 CPC .......... *H04L 9/0861* (2013.01); *H04L 9/0825* (2013.01); *H04L 61/4511* (2022.05)

(58) Field of Classification Search
 None
 See application file for complete search history.

(56) References Cited

U.S. PATENT DOCUMENTS

| | | | | |
|---|---|---|---|---|
| 9,729,565 | B2 * | 8/2017 | Reddy | H04L 67/10 |
| 10,541,996 | B1 | 1/2020 | Choi et al. | |
| 11,405,189 | B1 | 8/2022 | Bennison | |
| 11,895,225 | B2 | 2/2024 | Bennison | |
| 2024/0305489 | A1 * | 9/2024 | Kasimov | G06Q 30/06 |
| 2024/0323034 | A1 * | 9/2024 | Kumar | H04L 9/3268 |

OTHER PUBLICATIONS

Cheng et al., Internet Engineering Task Force (IETF) Request for Comments (RFC) 7413, "TCP Fast Open", Dec. 2014, pp. 1-26.
E. Rescorla, Internet Engineering Task Force (IETF) Request for Comments (RFC) 8446, "The Transport Layer Security (TLS) Protocol Version 1.3", Aug. 2018, pp. 1-160.
P. Mockapetris, Network Working Group, Request for Comments (RFC) 1035, "Domain Names—Implementation and Specification", Nov. 1987, pp. 1-55.

* cited by examiner

*Primary Examiner* — Bassam A Noaman
(74) *Attorney, Agent, or Firm* — Birch, Stewart, Kolasch & Birch, LLP

(57) ABSTRACT

A method, system, and machine-readable recording medium for accelerated exchange and secure provisioning of symmetric session encryption-keys between systems by tunneling over the public Internet domain name service (DNS) to establish an encrypted communication session, a method referred to as DNS Fast Open (DFO), which improves on the speed of the prior-art by routing data more efficiently across the internet with fewer round trips, thereby reducing time, bandwidth and network computing resources, as well as improving security by utilizing shared-secret key-derivation keys to generate symmetric encryption-keys which may provide quantum-safe confidentiality protection to information in electronic communications, particularly for use in an e-commerce environment.

11 Claims, 3 Drawing Sheets

Key Establishment via DNS Tunneling Utilizing Pre-Shared Symmetric Key-Derivation Keys Key Establishment via DNS Tunneling Utilizing Pre-Shared Symmetric Key-Derivation Keys

SYSTEMS AND METHODS USING DNS TUNNELING FOR FAST SYMMETRIC SESSION ENCRYPTION KEY ESTABLISHMENT USING A COMPUTING DEVICE

CROSS-REFERENCE TO RELATED APPLICATIONS

This application is an improvement, which is usable in connection with the disclosure of U.S. patent application Ser. No. 17/864,258 filed Jul. 13, 2022 now U.S. Pat. No. 11,895,225 B2 (hereafter referred to as the -225- patent) granted Feb. 6, 2024 entitled "Systems and Methods for Trustworthy Electronic Authentication Using a Computing Device," which is hereby expressly incorporated by reference into the present application. It is also usable in connection with the disclosure of U.S. patent application Ser. No. 17/530,136 filed on Nov. 18, 2021 now U.S. Pat. No. 11,405,189 B1 (hereafter referred to as the -189- patent) granted Aug. 2, 2022 entitled "Systems and Methods for Trustworthy Electronic Authentication Using a Computing Device," which is also hereby expressly incorporated by reference into the present application.

FIELD OF THE INVENTION

The present application is directed to systems and methods to utilize Domain Name Service (DNS) tunneling to securely provision and rapidly exchange symmetric session encryption-keys between systems by using shared-secret key-derivation keys, thereby providing faster quantum-safe confidentiality protection to information in electronic communications, particularly for use in an e-commerce environment.

BACKGROUND

Key exchange (also known as key-establishment) is a method in cryptography by which encryption-keys are exchanged between parties to apply confidentiality protection to information while conducting electronic communication sessions. The most prevalent prior-art method used in e-commerce today utilizes the Public Key Infrastructure (PKI) which relies on asymmetric cryptography which uses pairs of related large prime numbers as encryption and decryption keys used with asymmetric-key cryptographic algorithms. Each asymmetric key pair consists of a public key and a corresponding private key, where for instance, anyone with a public key can encrypt a message yielding ciphertext, but only those who know the corresponding private key can decrypt the ciphertext to recover the original plaintext message. One disadvantage of this method is that the long-term viability of current asymmetric-key cryptosystems is at increased risk of compromise when quantum computing becomes available at some time in the future making it practical to perform prime factorization of large integers which classic-computers are not capable of doing rapidly enough to be suitable for cryptanalysis in near real-time, thus rendering such asymmetric-key cryptosystems vulnerable.

The public Internet Domain Name Service (DNS), as specified in Internet Engineering Task Force (IETF) Request for Comments (RFC) 1035 "Domain Names-Implementation and Specification" (1987), which is expressly incorporated herein by reference, is like a phonebook for the Internet and is a query-response service whose primary purpose is to respond to requests from Internet connected systems for the numeric Internet Protocol (IP) address of any device connected to the Internet by looking up a Fully Qualified Domain Name (FQDN) in its Internet address database which is called a "zone file". Internet domain names are typically in a format such as "subdomain.domain.TLD", where TLD is a Top-Level Domain like ".com", ".org", ".gov", ".edu", etc. For example, "store.chain.com" could be the internet address of a web-site for an individual store in a chain of stores, and "chain.com" could be the web-site of the chain's headquarters. Thus, if a system for instance requests the IP address for domain "sample.com" and if the domain name server has a matching record in its zone file it may return an Internet Protocol version 4 (IPv4) address in the format x.x.x.x where "x" is an integer value between 0 and 255. These numerical Internet addresses are the way traffic is forwarded by network routing equipment to the destination device which has been assigned that unique numerical IP address on the Internet.

DNS "tunneling" was first discussed in the public domain in the late 1990s and by 2004 it was widespread enough to be the subject of a presentation at the Black Hat conference for hackers. DNS, as specified in IETF RFC 1035, was not intended for a command channel or general-purpose data transport; however, utilities were first developed to enable these capabilities by tunneling data over DNS for nefarious purposes like exfiltrating data surreptitiously from systems and transmitting it over DNS port 53, mostly in order to evade detection by firewalls. More recently, DNS tunneling has been adopted by various Internet entities for legitimate business purposes, such as Microsoft which utilized DNS tunneling to transmit Windows 10 telemetry data from their customers' systems to servers it controls. DNS tunneling is also commonly used by antivirus services to look up signatures for files when trying to make software updates. The basic concept of DNS "tunneling" is to prepend the data you want to transmit to the receiving system to the beginning of said system's domain name separated by the "dot" or "period" character, as specified in IETF RFC 1035, as if it were a subdomain name in this format: "data-to-be-sent.example.com". Since that domain name with the "data-to-be-sent" prepended to the beginning is not the name of a real system, the public DNS system that receives this request will not have the IP address record for this fictitious system in its zone file. The DNS process specified in IETF RFC 1035 for resolving addresses not found in the zone file is to forward the request to the "Authoritative Name-Server" for the base domain, in this illustration "example.com", and also forward the "data-to-be-sent" string prepended to the FQDN along with the DNS request on the assumption that the FQDN with that subdomain's IP address will be on file in the authoritative name-server's zone file. This allows the system owner of any system registered as the authoritative name-server of any arbitrary domain name to receive the "data-to-be-sent" string sent from the requesting system, and it can be used for whatever purpose that authoritative name-server's system owner desires. This, for instance, is how fraudsters use DNS tunneling for their malware to surreptitiously exfiltrate data over port 53 from unwitting victim systems to authoritative name-servers the fraudsters control.

Current asymmetric encryption-key establishment schemes involve the client system sending a DNS request to the public domain name service to obtain the IP address of the system with which it wants to establish encrypted communications, and then sending a request to that target system to initiate the establishment of a session encryption-key. The encryption-key establishment protocol most prevalent in e-commerce is described in Internet Engineering Task Force (IETF) Request for Comments (RFC) 7413 "Transmission Control Protocol (TCP) Fast Open (TFO)" (2014), expressly incorporated herein by reference, which requires a handshake with minimum of 2 round trips across the Internet, not including the DNS request/response messages to obtain the IP address of the system with which it wants to communicate, and not including 2 PKI request/responses for each communicating system to obtain the other's public key. Therefore, the TFO method typically requires a total of 5 round trips across the Internet to complete encryption-key establishment for each communications session.

What is needed is a scheme for faster key-exchange and more secure (e.g., post-quantum) encryption-key provisioning that overcomes the disadvantages of the prior-art.

OBJECTIVES AND BENEFITS

The exemplary embodiments described herein, e.g., when used in the light of the teachings of the -225- patent and -189- patent, overcome some or all of the disadvantages of asymmetric cryptography schemes described above in the BACKGROUND section of the present application, and exhibit some or all of the following advantages achieved in accordance with the teachings of the present application:

An advantage of exemplary embodiments disclosed herein is that they may provide a faster, more secure and more resource efficient method for provisioning and exchanging encryption keys across the Internet. By tunneling across the DNS infrastructure for encryption-key provisioning and exchange, the disclosed embodiments may reduce the number of round trips across the Internet to and from the DNS systems and eliminate the round trips for queries and responses to and from the PKI certificate authority systems, which may reduce the total number of Internet round trips required by as much as 70% compared to the most prevalent prior-art TFO method for key-establishment, thereby proportionately reducing the total bandwidth, network and compute resources consumed as well as reducing the elapsed time required.

An advantage of disclosed embodiments is the use of symmetric-key encryption to protect data confidentiality is considered by cryptographers to be the best long-term cryptographic solution when used with "quantum-resistant" or "quantum-safe" cryptographic algorithms and key lengths, and may comply with post-quantum standards necessary to be "quantum-ready" as recommended by the National Institute of Standards and Technology (NIST), the National Security Agency (NSA) and other cryptographic standard-setting organizations. It should be noted that, unlike asymmetric-key cryptography, symmetric-key cryptography with key lengths of 512 bits or more are considered by cryptographers to be quantum-immune for the foreseeable future.

An advantage of disclosed embodiments is that they may provide a method for encryption-key establishment that does not depend on the quantum vulnerable Public Key Infrastructure (PKI) asymmetric-key management system.

An advantage of disclosed embodiments is that they can help overcome the challenge of symmetric-key management at-scale by providing a cost-efficient and scalable method for using a one-time-pad (OTP) encryption key to securely exchange a shared-secret key-derivation key, sometimes called a "master key" or "ignition key", that may be used as an input to cryptographic operations including key derivation functions or key expansion functions to derive or generate symmetric encryption keys. According to cryptography experts any cryptosystem that desires to achieve information-theoretical perfect secrecy must be based on OTP-like encryption schemes such as those described in this disclosure, the -225- patent, and the -189- patent in order to be resistant to quantum cryptanalysis and brute force attack.

BRIEF DESCRIPTION OF THE DRAWINGS

The details of the disclosed invention, both as to its structure and operation, can best be understood in reference to the accompanying drawings in which.

DETAILED DESCRIPTION OF DISCLOSED EMBODIMENTS

Figure 1:
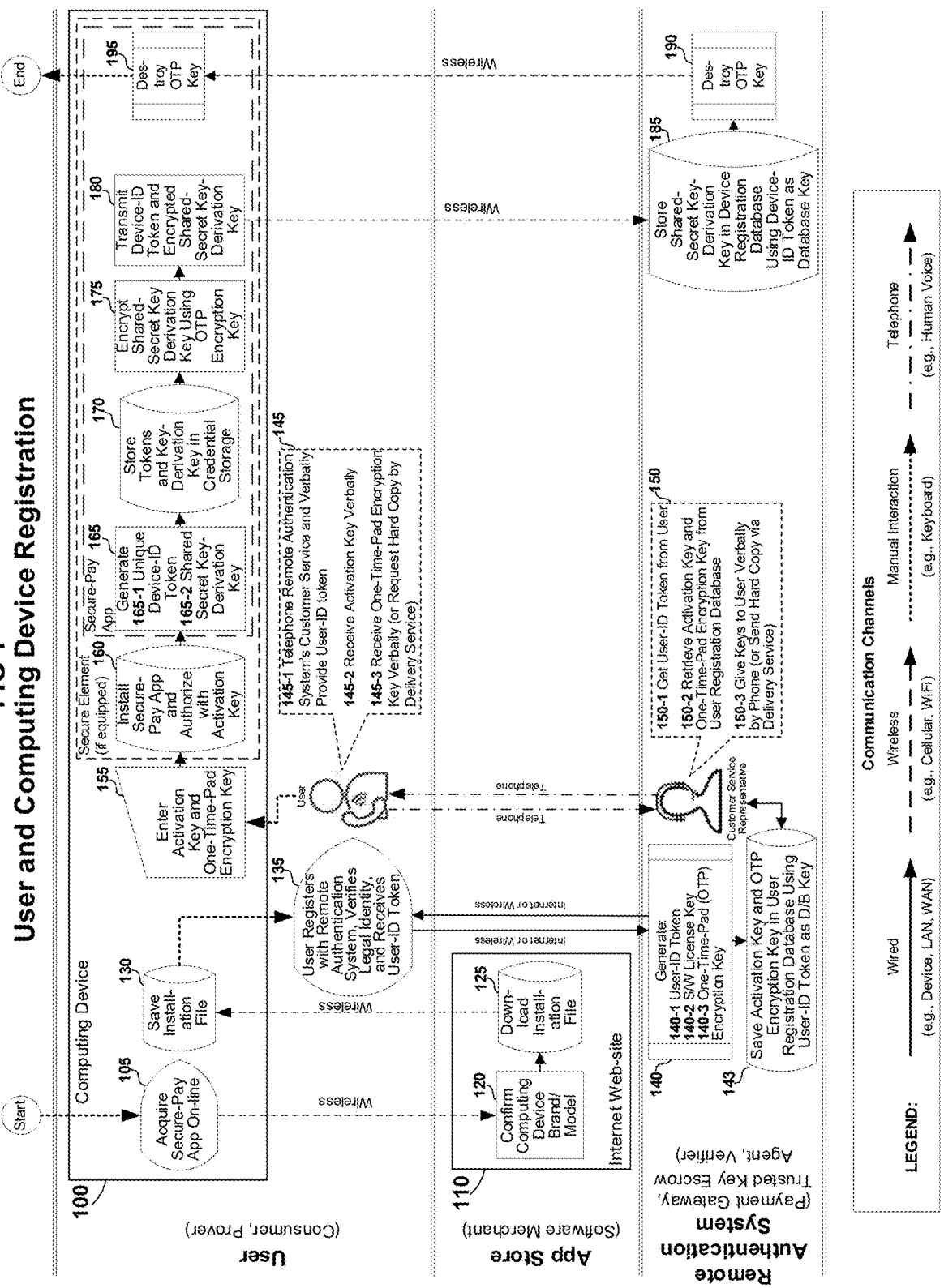
FIG. 1 is a system diagram showing a USER AND COMPUTING DEVICE REGISTRATION process (disclosed as FIG. 1 in the referenced -225- patent) which shows the client computing device registration and secure exchange of a device-unique shared-secret key-derivation key with a remote authentication system (e.g., trusted key-escrow agent) by using a OTP encryption key.

In these further embodiments, which are improvements over the referenced -225- patent and -189- patents, a new post-quantum symmetric encryption-key establishment scheme is created as explained in the following sections. The present application describes systems, methods and machine-readable data storage medium implementing symmetric encryption-key provisioning and exchange, which is also known as key-establishment, according to the teachings of the present invention. Note the scope of the present invention is defined solely by the claims appended hereto. Referring to FIG. 1: USER AND COMPUTING DEVICE REGISTRATION.

Figure 2:
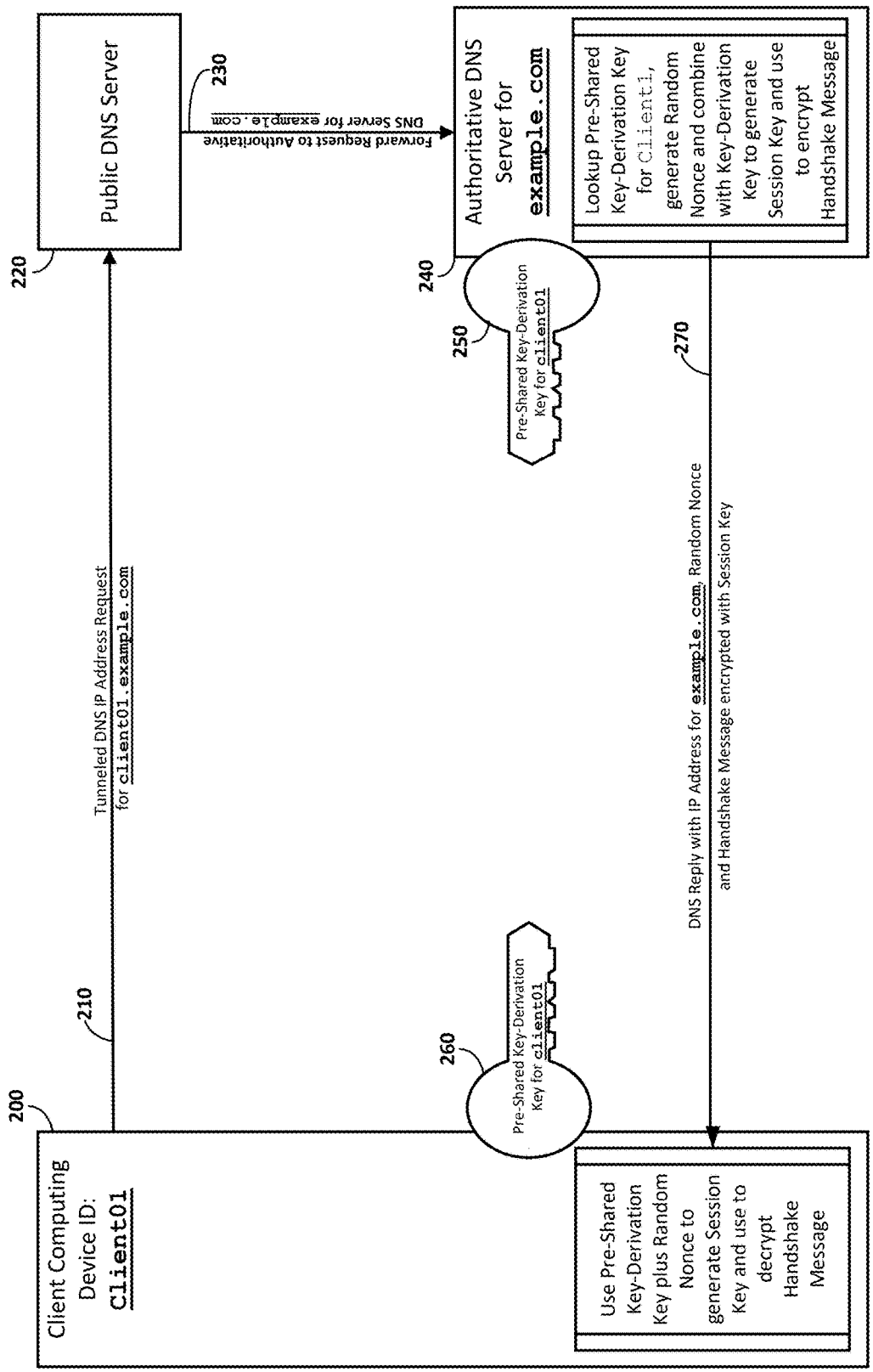
FIG. 2 is a system diagram disclosing a KEY ESTABLISHMENT VIA DNS TUNNELING UTILIZING PRE-SHARED SYMMETRIC KEY-DERIVATION KEYS process for tunneling the request through the public DNS infrastructure to exchange the encryption-key provisioning request and necessary data between the client computing device and an "authoritative name-server".

This diagram is also disclosed in FIG. 1 from the -225- patent and illustrates how a shared-secret key-derivation key is pre-shared utilizing a one-time-pad encryption-key to transmit it with information-theoretical perfect secrecy between the client computing device and the trusted key-escrow agent for future use, such as the key establishment method described in FIG. 2. Note that FIG. 1 from the -225- patent contains additional steps that are not particularly relevant to this disclosed improvement and therefore are not described herein and can be disregarded for the purposes of this disclosure.

In step 165, the client computing device 100 generates a device-unique identity token 165-1 cryptographically bound to the client computing device 100 (as described in corresponding step 165 of FIG. 1 in the -225- patent and the corresponding written description of the -225- patent) in that the device-unique identity token 165-1 is generated by a cryptographic technique applied to an unclonable device-unique hardware identifier with which the computing device is equipped. Alternatively, a device-unique identity token 165-1 cryptographically bound to the computing device 100 may be generated by utilizing software cryptographic methods such as Quasi-Physically Unclonable Digital Identification (Q-PUDID) by Sandia Labs (described in U.S. Pat. No. 10,541,996 B1) software that creates an immutable quasi-physically unclonable digital device-unique identity token 165-1 by operating on physically identifying properties of the computing device.

Also, as shown in step 165, the computing device 100 generates a derived long-term shared-secret encryption key-derivation key 165-2 (as also described in the corresponding step 165 and FIG. 1 in the -225- patent and the corresponding written description in the -225- patent). By way of example, cryptographic transforms may be performed using the device-unique identity token 165-1 and a registered user's identity token 140-1 to generate a derived long-term shared-secret encryption key-derivation key 165-2 that is cryptographically bound to both the registered computing device and the registered user. The user's identity token 140-1 is generated by the remote authentication system, e.g., trusted key-escrow agent, in step 140 (which is described in corresponding step 140 of FIG. 1 in the -225- patent and the corresponding written description of the -225- patent). This user's identity token 140-1 may, by way of example, be constructed using a non-reversible one-way hash (e.g., SHA-2) of the user's Social Security Number (SSN) or equivalent (e.g., Individual Taxpayer Identification Number (ITIN), Alien Identification Number (AIN), etc.).

Then, according to step 170, the computing device 100 stores the device-unique identity token 140-1 and the shared-secret key-derivation key 165-2 in its machine-readable data storage mechanism (also known as machine-readable medium) according to step 170 (as described in corresponding step 170 of FIG. 1 in the -225- patent and the corresponding written description of the -225- patent), such as long-term storage on the computing device 100, preferably in hardware-protected and/or password-protected credential storage, for example the Android KeyStore, Apple iOS Keychain, Trusted Platform Module (TPM) or equivalent technology if the computing device is so equipped.

Then the device-unique identity token 165-1 and the shared-secret key-derivation key 165-2 are encrypted as shown in step 175 (as described in corresponding step 175 of FIG. 1 in the -225- patent and the corresponding written description in the -225- patent), using a one-time-pad encryption key 140-3, which is also generated by the remote authentication system, e.g., trusted key-escrow agent (as described in step 140-3 of FIG. 1 in the -225- patent and the corresponding written description in the -225- patent). This one-time pad encryption key 140-3 may be passed between the remote authentication system and the client computing device 100 out-of-band, such as by verbal transmission over telephone lines as shown in sub-step 150-3 of step 150 (described in corresponding sub-step 150-3 of FIG. 1 in the -225- patent and the corresponding written description in the -225- patent), to be entered into the computing device 100 manually by the user in step 155 (as described in step 155 of FIG. 1 in the -225- patent and the corresponding written description). Utilizing out-of-band transmission of the one-time pad encryption key 140-3, instead of transmitting it over the network connecting the two systems, can provide information-theoretical perfect secrecy, which may significantly increase the work-effort required for eavesdroppers to intercept and decrypt the transmission of the shared-secret key-derivation key 165-2.

Then the computing device 100 transmits the encrypted data to the remote authentication system, e.g., trusted key-escrow agent, in step 180 (as described in corresponding step 180 of FIG. 1 in the -225- patent and the corresponding written description in the -225- patent). The encrypted data is typically transmitted wirelessly from the client computing device 100 to the remote authentication system. Then, as shown in step 185, the remote authentication system, e.g., trusted key-escrow agent, stores the device-unique identity token 165-1 and shared secret key-derivation key 165-2 in the device registration database (as described in corresponding step 185 of FIG. 1 in the -225- patent and the corresponding written description of the -225- patent). This storing step 185 may be performed using the device-unique identity token 165-1 as the database key.

Referring to FIG. 2: KEY ESTABLISHMENT VIA DNS TUNNELING UTILIZING PRE-SHARED SYMMETRIC KEY-DERIVATION KEYS.

FIG. 2 illustrates a process that may be performed by a client computing device 200, a remote system 240, and a public domain name service (DNS) server or system 220. For example, the client computing device 200 may be a computing device 100 which is part of the example above described in connection with FIG. 1. In this disclosure, the remote system 220 with which the client computing device 200 is trying to create an encrypted communication session may be a remote authentication system or trusted key-escrow agent as described above in the example embodiment of FIG. 1. This remote system 220 may have (or be part of a system which has) already registered itself with the Internet Domain Name Service (DNS) as the "authoritative name-server", as specified in IETF RFC 1035, for an arbitrary domain name. As such, the names "trusted key-escrow agent", "remote system", "remote authentication system" and "authoritative name-server" are used interchangeably in connection with this example embodiment of FIG. 2 and refer to the same computing system or device 240 illustrated in FIG. 2.

Initially, the client computing device 200 reads from its machine-readable data storage mechanism a device-unique identity token cryptographically bound to the client computing device 200 (e.g., the device-unique identity token 165-1 described above in connection with step 165 of FIG. 1). For purposes of explanation, the device-unique identity token, which is read from storage, is referred to as Client01 in FIG. 2. The client computing device 200 generates a DNS request 210 with the device-unique identity token, i.e., by formatting the device-unique identity token as a character string usable as a subdomain name, and prepending it to the beginning of the domain name of the target system (i.e., the remote system or trusted key-escrow agent). For example, in FIG. 2 illustrates the result of formatting the device-unique identity token to be "client01", and the domain name of the remote system to be "example.com". Thus, by appending a "dot" character to the end of the formatted device-unique identity token ("client01") and prepending the resultant character string to the domain name ("example.com"), the client computing device 100 produces a fictitious fully qualified domain name (FQDN) "client01.example.com" as specified in IETF RFC 1035. Here, the term "fictitious" conveys that the FQDN does not fully match any entries in the Internet address database when checked by a public DNS system (i.e., 220 of FIG. 2).

Then, as shown in flow 210 of FIG. 2, the computing device 200 sends the generated FQDN in a DNS request to an arbitrary public DNS system 220, i.e., the public DNS system 220 which is configured on the client computing device 200 as its default domain name resolver. The public DNS system 220 receives the DNS request and searches its zone file for the fictitious FQDN ("client01.example.com" in this example) and does not find it (given that the FQDN is fictitious), thus prompting the public DNS system 220 to transmit the DNS request to the authoritative name-server 240 that it has on file for the domain name ("example.com" in this example) as illustrated in process 230 of FIG. 2. The transmission of the DNS request is illustrated in flow 230. As a result of receiving the DNS request, the authoritative name-server 240, which in the example of FIG. 2 is a trusted key-escrow agent, receives the DNS request and parses the device-unique identity token ("client01" in this example) from the fictitious FQDN within the DNS request.

As illustrated in FIG. 2, the authoritative name-server 240 performs a predefined process of using the received device-unique identity token to look up a shared-secret key-derivation key 250 for the client computing device 200 (e.g., the shared-secret key-derivation key 165-2 of FIG. 1) that has been previously stored in its device registration database (e.g., as described above in connection with step 185 of FIG. 1). Then, as another predefined process, the authoritative name-server 240 generates a session encryption-key using a method such as generating a random nonce and combining the nonce with the shared-secret key-derivation key 250 and performing cryptographic operations on the resultant combination. These cryptographic operations may be performed, e.g., using a secure hashing algorithm like SHA2 with a key length of 512 bits or greater, to create a quantum-immune symmetric session encryption-key. Then the authoritative name-server 220 may perform a predefined process of creating an arbitrary handshake message, for example "Hello Client01", and encrypting it with the session encryption key, as illustrated in FIG. 2.

As shown in flow 270, the authoritative name-server 240 transmits directly to the client computing device 200 a DNS reply, which contains the IP address of the system with which it wants the client computing device 220 to establish an encrypted session connection. For instance, the DNS replay may contain the IP address of the authoritative name-server 240 itself, or any arbitrary system it nominates as its proxy. The DNS replay may also contain the random nonce it used to create the session encryption key, and the encrypted handshake message. Upon receiving the DNS reply in flow 270, the client computing device 200 combines the random nonce with its own stored copy of the shared-secret key-derivation key 260 (e.g., the shared-secret key-derivation key 165-2 generated according to step 165 of FIG. 1), and performs on the resultant combination the same cryptographic operations as performed by the authoritative name-server 220 in order to create a matching symmetric session encryption-key. The client computing device 200 then uses the session encryption-key to decrypt the encrypted handshake message in the DNS reply, and verify that it successfully received and decrypted the handshake message (e.g., "Hello Client01") expected from the authoritative name-server 220.

It should be noted that the flows 210, 230, and 270 depicted in FIG. 2 represent communications, which may comprise wired and/or wireless transmissions, conducted over at least one communications network such as the Internet connecting the client computing system 200, the public DNS server 220, and the authoritative name-server 240.

Using the method shown in FIG. 2, the generation and exchange of matching quantum-immune symmetric session encryption-keys can be completed using fewer Internet round trips than prior-art methods prevalent in e-commerce.

In another embodiment, the authoritative name-server 240 may be a load-balancer or other system type serving as the end-point for the domain name "example.com", which for example may be configured as a front-end for an array of encryption systems or other types of systems connected to it. In this embodiment, the authoritative name-server may route the encrypted session traffic from the client computing device 200 to one of systems in the array by providing within the DNS reply of flow 270 the IP address of a nominated system in the array instead of its own IP address, and by further passing the session encryption key to the nominated system in the array (preferably over a trusted connection to protect the confidentiality of the encryption key).

In another embodiment, the trusted key-escrow agent system 240 may act as a key-exchange broker to provision and securely exchange session encryption keys between a plurality of client computing devices or servers.

In another embodiment, optional additional transaction data, such as random challenge-response strings or numbers (as described in the -189- patent at step 425 in FIGS. 4(a) thru 4(d) and the corresponding written description), or other transaction data, may be included as text in TXT Resource Record (RR) fields, as specified in IETF RFC 1035, in the DNS request and reply messages of flows 210 and 270. The inclusion of such additional data can reduce the number of Round Trip Times (RTTs) required for the authentication transaction. For example, the optional additional transaction data could be used as the random challenge factor in multi-factor authentication transactions (as described in the -189- patent at steps 455 through 490 of FIGS. 4(a) thru 4(d), and the corresponding written description). In this example, each character of the user's password is drawn by the user on a trusted input of the computing device in the correct order to match the random challenge-response string.

Figure 3:
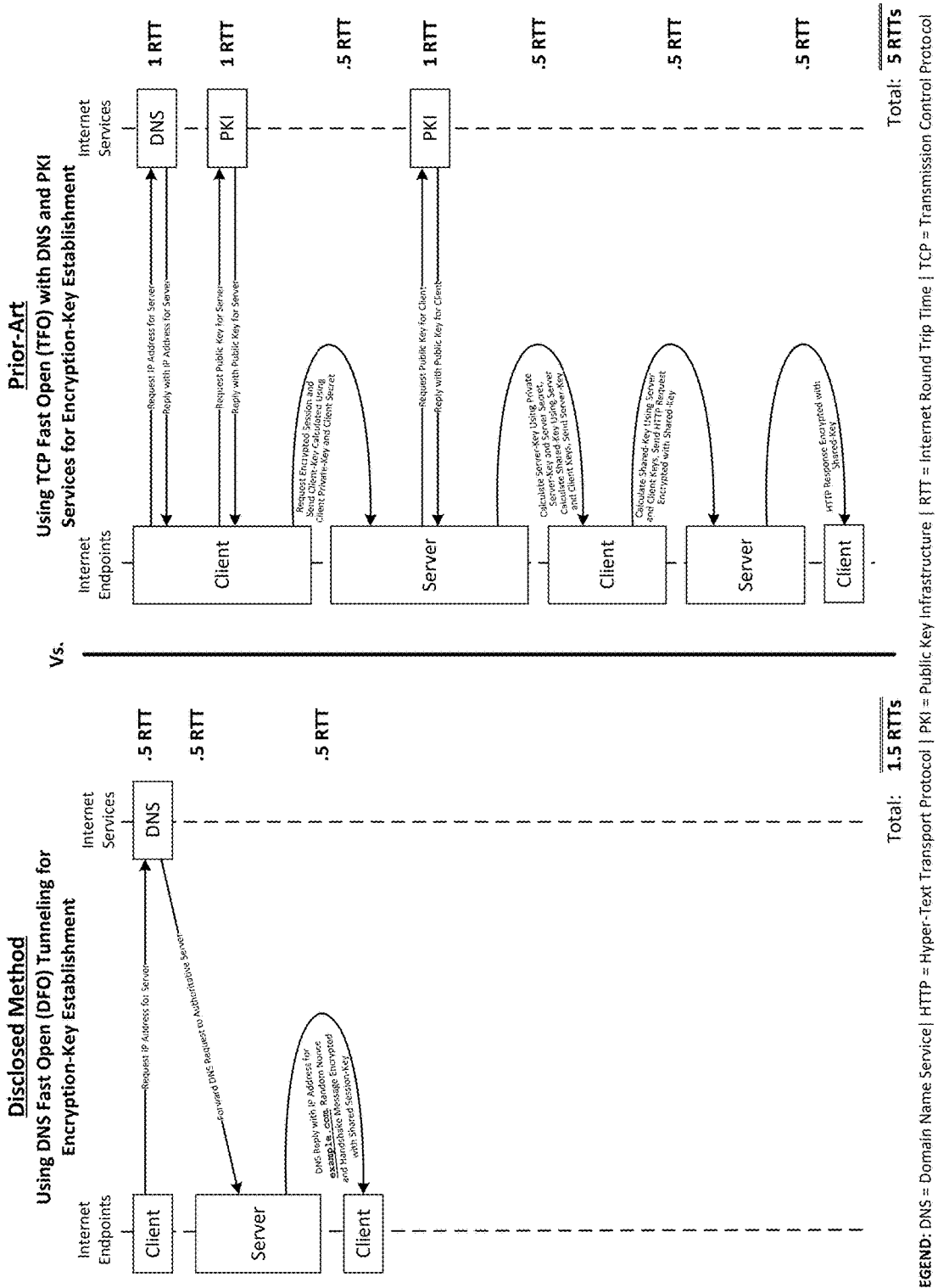
FIG. 3 is a system diagram COMPARING THE RELATIVE EFFICIENCY OF ENCRYPTION-KEY ESTABLISHMENT USING DNS TUNNELING VS. TCP FAST OPEN showing a side-by-side comparison of the relative efficiency, as measured in Internet round trip times (RTTs), between exchanging encryption-keys using the disclosed DNS tunneling and shared-secret key-derivation key-establishment method versus the most prevalent prior-art method which utilizes the Public Key Infrastructure (PKI).

In another embodiment, optional additional transaction data (such as the cipher suite, various parameters and security associations, etc., used for the cryptographic operations to create the session encryption-key) may be negotiated between the communicating systems using a protocol such as described in IETF RFC 8446 "Transport Layer Security (TLS) 1.3" (2018). In such a case, the cipher suite, parameters and security associations, etc., for this negotiation may also be included as TXT RR fields included in the DNS request and response messages during the exchange. Referring to FIG. 3: COMPARING RELATIVE EFFICIENCY OF ENCRYPTION-KEY ESTABLISHMENT USING DNS TUNNELING VS. TCP FAST OPEN.

The two diagrams in FIG. 3 provide a side-by-side comparison of the times required to complete the requisite key-establishment handshake transactions in the presently disclosed method of DNS tunneling utilizing pre-shared symmetric key derivation keys method versus the prevalent prior-art TCP Fast Open (TFO) method utilizing the Public Key Infrastructure (PKI). The respective times depicted in FIG. 3 are measured in terms of Internet Round Trip Times (RTTs), rather than elapsed clock time, where RTTs is the accepted industry standard method of measuring the relative speed of transactions conducted over the public Internet. The RTT metric is used because Internet transit times are so highly variable depending on network latency caused by unpredictable traffic volume, the geographic location and physical distance between systems, the variability of routing on a packet-switched mesh network, the speed of all the networking equipment in between systems, the cable type (e.g., copper, fiber-optic), the Internet Protocol used (e.g., IPv4, IPv6), etc. Therefore, this comparison is necessarily limited to comparing the number of RTTs for each method rather than clock timing; however, assuming each method is running on the same physical network (e.g., the Internet) then the RTTs should be a valid indicator of the relative performance of the two methods. The data exchanges in the DNS Fast Open (DFO) diagram on the left are as described in FIG. 2 of the present application. The exchanges in the TCP Fast Open (TFO) diagram on the right are as described in IETF RFC 7413.

I claim:

1. A method performed by a client computing device for negotiating session encryption-keys with another computing device, which is part of a system registered with an Internet domain name service as an authoritative name-server for an Internet domain name, and which is connected to the client computing device by a network, the method utilizing Internet domain name service tunneling to employ pre-shared shared-secret key-derivation keys to generate and securely exchange symmetric session encryption-keys, the method comprising:

obtaining from a machine-readable data storage mechanism associated with the client computing device a device-unique identity token cryptographically bound to said computing device;

generating a domain name by appending a "dot" character to said device-unique identity token and then concatenating the appended device-unique identity token with the Internet domain name registered to said authoritative name-server;

transmitting said domain name in a request for said authoritative name-server's internet protocol address to an arbitrary public domain name service device over the network communicatively coupled to the client computing device thereby causing the public domain name service device to, upon not finding a match between the generated domain name and an Internet address database, forward a domain name service request for said generated domain name to the authoritative name-server;

receiving a domain name service response including an Internet Protocol address provided by the authoritative name-server, an encrypted handshake message and a random nonce;

obtaining from the machine-readable data storage mechanism associated with the client computing device a shared-secret key-derivation key;

generate a matching symmetric session encryption-key by combining the random nonce and the shared-secret key-derivation key and performing cryptographic operations on the appended device-unique identity token;

decrypting the encrypted handshake message with said session encryption-key; and verifying the handshake message was successfully decrypted.

2. The method of claim 1, wherein the Internet Protocol address provided by the authoritative name-server in the domain name service response is an Internet Protocol address of a remote system different than the authoritative name-server, wherein the different remote system is provided the generated session encryption-key facilitating establishment by the client computing device of an encrypted session with the different remote system.

3. The method of claim 1, wherein additional transaction data is transmitted from the client computing device to the authoritative-name server or received by the client computing device from the authoritative name server, by virtue of said additional transaction data being incorporated in text resource record or other fields included in one or more domain name service requests and/or domain name service response messages.

4. The method of claim 3, wherein the additional transaction data includes at least one of challenge-response strings and cipher suites.

5. The method of claim 1, wherein the client computing device is one of a plurality of computing devices that exchange matching symmetric session encryption-keys using the authoritative name-server operating as a key-exchange broker in order to provision and exchange symmetric session encryption-keys to perform data encryption and decryption for confidentiality protection of communications between the plurality of computing devices.

6. A non-transitory computer readable medium on which is stored instructions which, when executed by the client computing device, executes the method of claim 1.

7. A method performed by a computing device, which is part of a system registered with an internet domain name service as an authoritative name-server for an Internet domain name, for negotiating session encryption-keys with a client computing device, which is connected to the computing device by a network, the method utilizing Internet domain name service tunneling to employ pre-shared shared-secret key-derivation keys to generate and securely exchange symmetric session encryption-keys, the method comprising:

receiving, from a public domain name service device, a domain name service request, for a requested domain name, comprised of a character string with a "dot" character appended to the end of the character string and concatenated to the Internet domain name registered to said authoritative name-server, wherein the requested domain name does not have a match in an Internet address database searched by the public domain name service device;

parsing the character string to acquire a device-unique identity token for the client computer device;

using the device-unique identity token to retrieve a shared-secret key-derivation key associated with the client computing device;

generating a random nonce;

generating a session encryption-key by combining said random nonce with said shared-secret key-derivation key and performing cryptographic operations on the appended character string;

generating a handshake message;

encrypting said handshake message with said session encryption-key;

transmitting an Internet Protocol address, the encrypted handshake message and the random nonce to the client computing device over the network.

8. The method of claim 7, wherein the Internet Protocol address is provided by the authoritative name-server in a domain name service response and is an Internet Protocol address of a remote system different than the authoritative name-server, wherein the different remote system is providing the generated session encryption-key facilitating establishment by the client computing device of an encrypted session with the different remote system.

9. The method of claim 7, wherein additional transaction data is transmitted from the computing device to the client computing device or received by the computing device from the client computing device, by virtue of said additional transaction data being incorporated in text resource record or other fields included in one or more domain name service requests and/or domain name service response messages.

10. The method of claim 9, wherein the additional transaction data includes at least one of challenge-response strings and cipher suites.

11. A non-transitory computer readable medium on which is stored instructions which, when executed by the computing device, executes the method of claim 7.

* * * * *